United States Patent [19]
Breton et al.

[11] Patent Number: 5,788,749
[45] Date of Patent: Aug. 4, 1998

[54] PIGMENTED INK COMPOSITIONS CONTAINING LIPOSOMES

[75] Inventors: Marcel P. Breton, Mississauga, Canada; Susanne Birkel, Rossdorf, Germany; Carl P. Tripp, Burlington; Jaan Noolandi, Mississauga, both of Canada

[73] Assignee: Xerox Corporation, Stamford, Conn.

[21] Appl. No.: 799,946

[22] Filed: Feb. 14, 1997

[51] Int. Cl.[6] ............................................. C09D 11/06
[52] U.S. Cl. .................. 106/31.6; 106/31.65; 106/31.75; 106/31.86
[58] Field of Search ........................ 106/31.6, 31.65, 106/31.75, 31.86

[56] References Cited

U.S. PATENT DOCUMENTS

| | | |
|---|---|---|
| 4,251,824 | 2/1981 | Hara et al. ........................ 346/140 R |
| 4,410,899 | 10/1983 | Haruta et al. .................... 346/140 R |
| 4,412,224 | 10/1983 | Sugitani .............................. 346/1.1 |
| 4,532,530 | 7/1985 | Hawkins ........................... 346/140 R |
| 4,601,777 | 7/1986 | Hawkins et al. ..................... 156/626 |
| 4,783,220 | 11/1988 | Gamble et al. ........................ 106/27 |
| 4,877,451 | 10/1989 | Winnik et al. ........................ 106/23 |
| 4,880,432 | 11/1989 | Egan et al. ............................. 8/647 |
| 4,963,652 | 10/1990 | Tortorici et al. ..................... 524/604 |
| 4,973,519 | 11/1990 | Tortorici et al. ..................... 524/602 |
| 5,122,187 | 6/1992 | Schwartz et al. ...................... 106/25 |
| 5,139,574 | 8/1992 | Winnik et al. ........................ 106/22 |
| 5,145,518 | 9/1992 | Winnik et al. ........................ 106/21 |
| 5,378,574 | 1/1995 | Winnik et al. ....................... 430/115 |
| 5,626,654 | 5/1997 | Breton et al. ..................... 106/31.33 |
| 5,633,109 | 5/1997 | Jennings et al. .................. 106/31.34 |

Primary Examiner—Helene Klemanski
Attorney, Agent, or Firm—Judith L. Byorick

[57] ABSTRACT

Disclosed is an ink composition which comprises an aqueous liquid vehicle, a pigment, and a vesicle-forming lipid, wherein vesicles of the lipid are present in the ink.

31 Claims, 3 Drawing Sheets

5,788,749

PIGMENTED INK COMPOSITIONS CONTAINING LIPOSOMES

BACKGROUND OF THE INVENTION

The present invention is directed to ink compositions and printing processes. More specifically, the present invention is directed to ink compositions containing liposomes of a vesicle-forming lipid and a pigment, and to printing processes employing said inks. One embodiment of the present invention is directed to an ink composition which comprises an aqueous liquid vehicle, a pigment, and a vesicle-forming lipid, wherein vesicles of the lipid are present in the ink.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, compatibility with both coated/treated and plain papers, image edge acuity, reduced image feathering, and non-toxic and non-mutagenic properties.

Heterophase inks containing pigment particles as colorants, however, also exhibit difficulties. For example, the particulate colorant may exhibit a tendency to settle out or separate from the liquid vehicle, particularly when the ink is stored for long periods of time. In addition, inks containing pigment particles as colorants tend to be opaque instead of transparent, which reduces their usefulness for printing images on transparencies for the purpose of overhead projection. Further, inks containing pigment particles as colorants tend to clog the narrow orifices of the printhead, resulting in deterioration of the print quality.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, U.S. Pat. No. 5,378,574 (Winnik et al.), the disclosure of which is totally incorporated herein by reference, discloses ink jet inks and liquid developers containing colored particles comprising hydrophilic porous silica particles to the surfaces of which dyes are covalently bonded through silane coupling agents.

U.S. Pat. No. 5,145,518 (Winnik et al.), the disclosure of which is totally incorporated herein by reference, discloses an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles. Optionally, silica is precipitated within the micelles. In a specific embodiment, the dye molecules are substantially colorless and the dye is detectable when exposed to radiation outside the visible wavelength range. In another specific embodiment, the ink also contains a colorant detectable in the visible wavelength range.

U.S. Pat. No. 4,880,432 (Egan et al.), the disclosure of which is totally incorporated herein by reference, discloses a process for preparing particles colored with a dye which comprises: (a) forming, by a free radical dispersion polymerization process in a nonaqueous solution, polymeric particles having attached thereto stabilizing copolymers with at least one functional group capable of undergoing a chemical reaction with a dye, the particles having an average diameter of from about 0.1 to about 20 microns; (b) adding a dye to the polymeric particles having attached thereto stabilizing copolymers; and (c) effecting a chemical reaction between the dye and the stabilizing copolymers that results in the dye becoming covalently bound to the polymeric particles. Also disclosed is a liquid electrophotographic developer composition comprising a liquid medium, a charge control agent, and colored polymeric toner particles prepared as stated above and having an average diameter of from about 0.5 to about 5 microns.

U.S. Pat. No. 4,783,220 (Gamble et al), the disclosure of which is totally incorporated herein by reference, discloses ink compositions consisting of small unilamellar or multilamellar vesicles formed from surfactants of anionic, cationic, zwitterionic, and nonionic molecules having an oil soluble dye, inclusive of a lipid soluble dye, associated therewith. The dye to surfactant ratio is preferably from about 1:1 to about 1:10. The compositions are useful in traditional printing techniques such as flexography and rotogravure and in electronic printing systems such as with an ink jet printer.

U.S. Pat. No. 5,122,187 (Schwarz et al.), the disclosure of which is totally incorporated herein by reference, discloses hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidinone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,139,574 (Winnik et al.), the disclosure of which is totally incorporated herein by reference, discloses an ink composition which comprises an aqueous liquid vehicle, a water-soluble dye, and particles of a block copolymer of the formula ABA, wherein A represents a hydrophilic segment and B represents a hydrophobic segment, said ABA particles having an average particle diameter of about 300 Angstroms or less. The ink is particularly suitable for use in ink jet printing systems, especially thermal ink jet printing systems.

Copending application U.S. Ser. No. 08/567,637, now U.S. Pat. No. 5,633,109, filed Dec. 5, 1995, entitled "Ink Compositions With Liposomes Containing Photochromic Compounds," with the named inventors Carol A. Jennings, Marcel P. Breton, Mary A. Isabella, Eric G. Johnson, Trevor I. Martin, and John F. Oliver, the disclosure of which is totally incorporated herein by reference, discloses an ink composition which comprises an aqueous liquid vehicle, a photochromic material, and a vesicle-forming lipid, wherein vesicles of the lipid are present in the ink.

Copending application U.S. Ser. No. 08/567,464, now U.S. Pat. No. 5,626,654, entitled "Ink Compositions Containing Liposomes," filed Dec. 5, 1995, with the named inventors Marcel P. Breton, Jaan Noolandi, MaryAnna Isabella, Susanne Birkel, and Gordon K. Hamer, the disclosure of which is totally incorporated herein by reference, discloses an ink composition which comprises an aqueous liquid vehicle, a dye, and a vesicle-forming lipid, wherein vesicles of the lipid are present in the ink.

While known compositions and processes are suitable for their intended purposes, a need remains for improved ink compositions suitable for use in ink jet printing systems. In addition, there is a need for ink compositions which can generate prints exhibiting excellent print characteristics such as small edge raggedness, desirable line width, and small mflen values. Further, a need remains for safe and environmentally friendly ink compositions. Additionally, there is a need for ink compositions which contain heterophase colorants and which exhibit good stability with respect to settling out of the colorant. There is also a need for ink compositions which exhibit good lightfastness. In addition, a need remains for ink compositions which exhibit good drying characteristics. Further, there is a need for ink compositions which exhibit reduced odor retention. Additionally, a need exists for ink compositions which are compatible with a printhead environment and exhibit, for example, good latency, kogation, and thermal stability characteristics. There is also a need for ink compositions which exhibit low foaming characteristics. In addition, a need remains for ink compositions which exhibit good pH stability. Further, a need remains for ink compositions which generate prints having good optical density. Additionally, there is a need for ink compositions which exhibit good waterfastness. There is also a need for ink compositions which generate prints having good smear resistance. In addition, a need remains for ink compositions having relatively low surface tensions. Further, a need remains for ink compositions having relatively low surface tensions in combination with characteristics such as good print quality, environmental friendliness and safety, fast drying characteristics, good optical density, good lightfastness, good dry smear resistance, good wet smear resistance, and good waterfastness.

SUMMARY OF THE INVENTION

It is an object of the present invention to provide ink compositions with the above noted advantages.

It is another object of the present invention to provide improved ink compositions suitable for use in ink jet printing systems.

It is yet another object of the present invention to provide ink compositions which can generate prints exhibiting excellent print characteristics such as small edge raggedness, desirable line width, and small mflen values.

It is still another object of the present invention to provide safe and environmentally friendly ink compositions.

Another object of the present invention is to provide ink compositions which contain heterophase colorants and which exhibit good stability with respect to settling out of the colorant.

Yet another object of the present invention is to provide ink compositions which exhibit good lightfastness.

Still another object of the present invention is to provide ink compositions which exhibit good drying characteristics.

It is another object of the present invention to provide ink compositions which exhibit reduced odor retention.

It is yet another object of the present invention to provide ink compositions which are compatible with a printhead environment and exhibit, for example, good latency, kogation, and thermal stability characteristics.

It is still another object of the present invention to provide ink compositions which exhibit low foaming characteristics.

Another object of the present invention is to provide ink compositions which exhibit good pH stability.

Yet another object of the present invention is to provide ink compositions which generate prints having good optical density.

Still another object of the present invention is to provide ink compositions which exhibit good waterfastness.

It is another object of the present invention to provide ink compositions which generate prints having good dry smear resistance.

It is another object of the present invention to provide ink compositions which generate prints having good wet smear resistance.

It is yet another object of the present invention to provide ink compositions having relatively low surface tensions.

It is still another object of the present invention to provide ink compositions having relatively low surface tensions in combination with characteristics such as good print quality, environmental friendliness and safety, fast drying characteristics, good optical density, good lightfastness, good smear resistance, and good waterfastness.

These and other objects of the present invention (or specific embodiments thereof) can be achieved by providing an ink composition which comprises an aqueous liquid vehicle, a pigment, and a vesicle-forming lipid, wherein vesicles of the lipid are present in the ink.

DETAILED DESCRIPTION OF THE INVENTION

The ink compositions of the present invention comprise an aqueous liquid vehicle, a pigment, and a vesicle-forming lipid, wherein vesicles of the lipid are present in the ink. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

Figure 1:
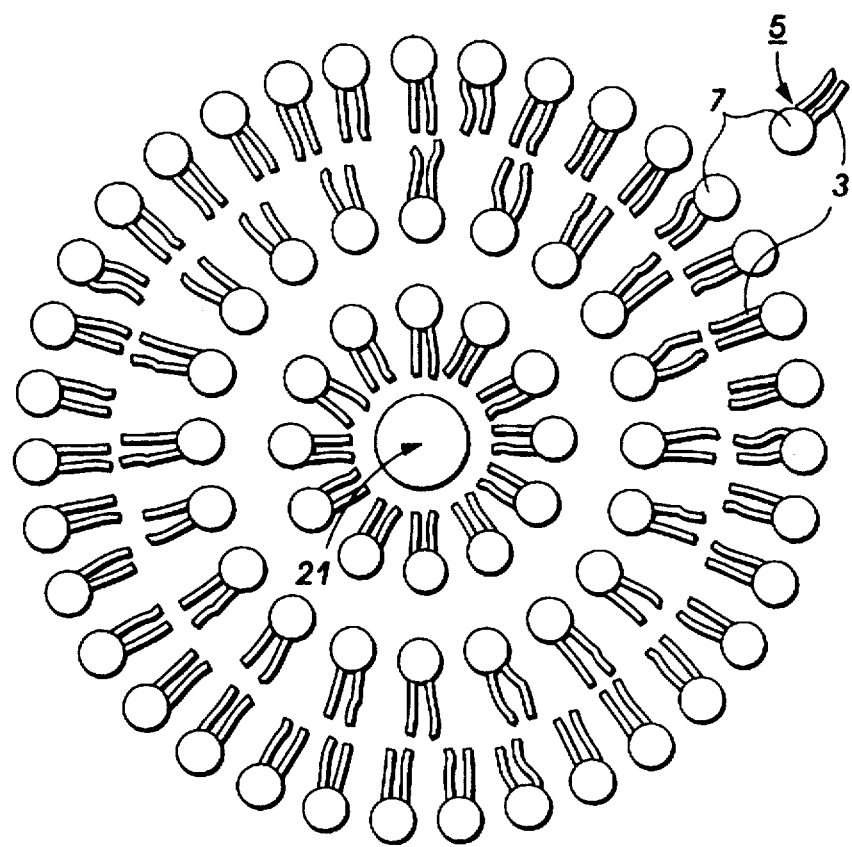
FIG. 1 illustrates schematically a liposome or vesicle having a single bilayered membrane in an aqueous ink of the present invention containing a hydrophilic pigment.
Figure 2:
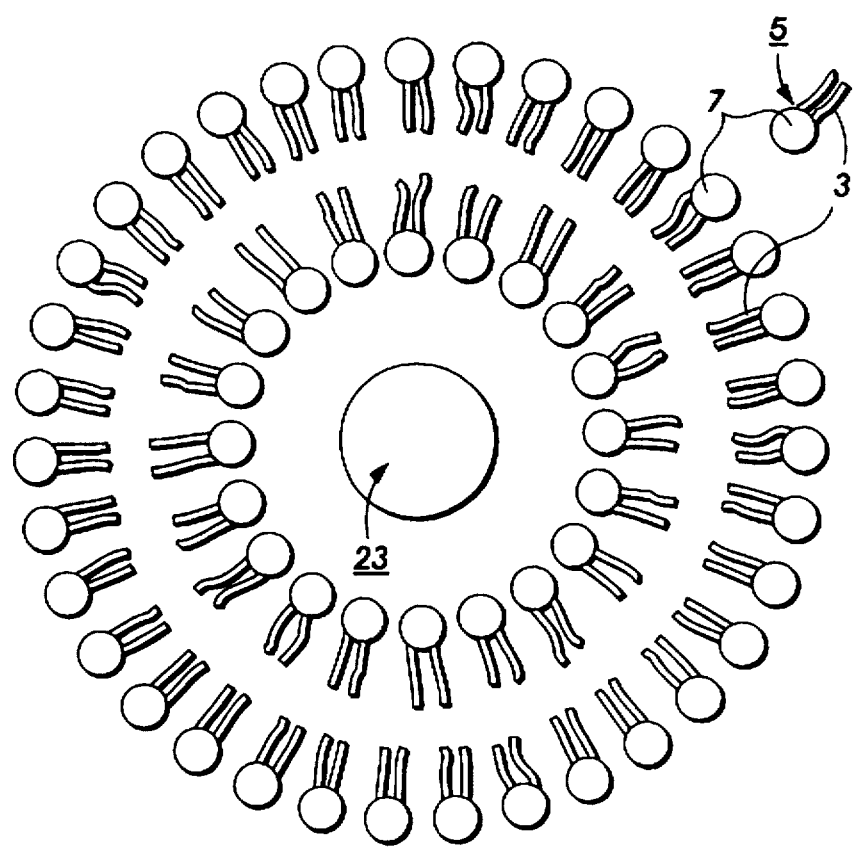
FIG. 2 illustrates schematically a liposome or vesicle having a multilayered membrane in an aqueous ink of the present invention containing a hydrophobic pigment.
Figure 3:
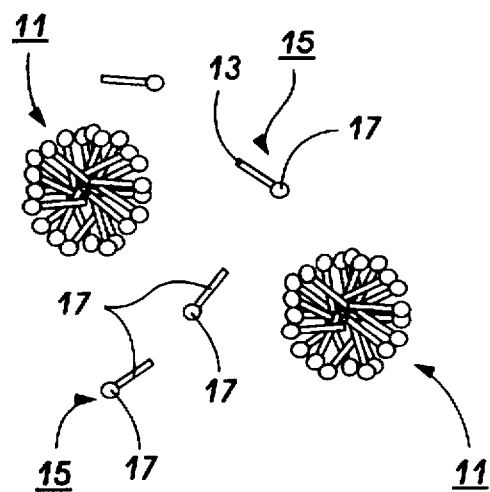
FIG. 3 illustrates schematically a micelle formed of surfactant molecules in aqueous solution.

The inks of the present invention also contain vesicles, or liposomes, of a vesicle-forming lipid. Lipids in general are substances that are soluble in organic solvents but are only sparingly soluble or insoluble in water. Lipids are generally classified according to their backbone structure, and include fatty acids, triacylglycerols, glycerophospholipids, sphingolipids, steroids, and the like. Vesicle-forming lipids usually have two nonpolar "tail" groups attached to a polar "head" group. In aqueous media, vesicle-forming lipids align themselves closely in planar bilayer sheets to minimize the unfavorable interactions between the bulk aqueous phase and the nonpolar groups. These unfavorable interactions are further reduced when the sheets fold on themselves to form closed sealed vesicles known as liposomes. As illustrated in FIGS. 1 and 2, in aqueous solution a vesicle 1 is formed having a multilayered membrane of lipid molecules 5 having nonpolar ends 3 and polar ends 7, wherein polar ends 7 form the exterior surface of the vesicle and nonpolar ends 3 form the inner structure of the outer membrane. In FIG. 1, a liposome having an odd number of molecular layers and optionally containing a hydrophobic pigment particle 21 is illustrated, and in FIG. 2, a liposome having an even number of molecular layers and optionally containing a hydrophilic pigment 23 is illustrated. These multilayered structures of vesicle-forming lipids tend to form in preference to micellar structures because the two nonpolar groups tend to impart to the molecule an overall tubular shape, which is more suitable for this type of aggregation. In contrast, surfactant molecules, which are also amphiphilic but which typically contain only one nonpolar "tail" group attached to a polar "head" group, form spherical micelles above their critical micelle concentration. The conical shape of the surfactant molecules enables formation of aggregations in a spherical micelle. As illustrated schematically in FIG. 3, micelles 11 formed in aqueous solution of surfactant molecules 15 and having nonpolar ends 13 and polar ends 17, are of a solid "ball" type structure. In contrast, vesicles or liposomes are of a hollow "bag" type structure.

Liposomes are able to entrap materials both within the inner compartment of the "bag" structure" and between the layers of the bilayer membrane. In addition, some liposomes have more than one bilayer membrane, wherein the membranes form concentrically; in this instance, materials can also be entrapped between the bilayer membranes.

Figure 4:
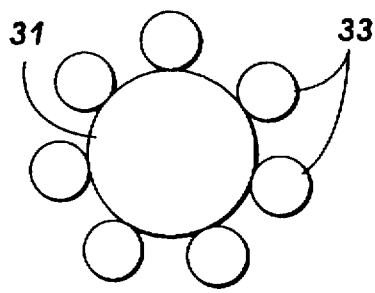
FIG. 4 illustrates schematically an arrangement of liposomes or vesicles around a pigment particle in an aqueous ink of the present invention.

In the inks of the present invention, the pigment particles can be situated inside of liposomes, as, for example, illustrated schematically in FIGS. 1 and 2. Alternatively, as illustrated schematically in FIG. 4, pigment particles 31 can be surrounded by or associated with one or more liposomes 33. In yet another embodiment, both the pigment particles and the liposomes can be present in the ink but not physically associated with each other.

Glycerophospholipids are the major lipid component of biological membranes and consist of sn-glycerol-3-phosphate esterified at its C(1) and C(2) positions to fatty acids and at its phosphoryl group to a polar head group X:

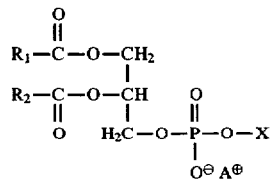

wherein $R_1$ and $R_2$ are aliphatic hydrocarbons, preferably with from about 6 to about 20 carbon atoms, although the number of carbon atoms can be outside this range. Phosphatidyl phospholipids are generally negatively charged, since the charge on the phosphate is not neutralized by the head group. If "X" contains a positive charge there is no need to have the counter-ion A+ present in the ink. If "X" is neutral, $A^+$ is a counterion such as $Ca^{2+}$, $Mg^{2+}$, $Na^+$, $Li^+$, $H^+$, $NH_4^+$, or the like. Preferred counterions are monovalent, since the use of divalent or trivalent counter-ions can produce structural rearrangements and binding between layers in some instances. Glycerophospholipids are amphiphilic molecules with nonpolar aliphatic tails ($R_1$ and $R_2$) and polar phosphoryl-X heads. Examples of common classes of glycerophospholipids include phosphatidic acids, wherein X is a hydrogen atom, phosphatidylethanolamines, wherein X is —$CH_2CH_2NH_3^+$, phosphatidylcholines, wherein X is —$CH_2CH_2N(CH_3)_3^+$, phosphatidylserines, wherein X is —$CH_2CH(NH_3^+)COO$—, phosphatidylinositols, wherein X is

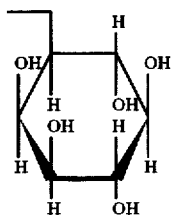

phosphatidylglycerols, wherein X is —$CH_2CH(OH)CH_2OH$, diphosphatidylglycerols, wherein X is

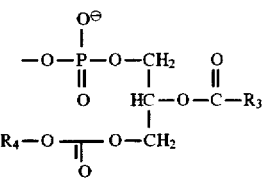

wherein the negatively charged oxygen can be associated with any suitable counterion, such as $H^+$, $Na^+$, $Li^+$, $Ca^{2+}$, $Mg^{2+}$, $Ba^{2+}$, or others, and the like. $R_1$ and $R_2$ (as well as $R_3$ and $R_4$ in the diphosphatidylglycerols) generally are hydrocarbon groups, preferably with from about 6 to about 20 carbon atoms and more preferably with from about 10 to about 18 carbon atoms, although the number of carbon atoms can be outside these ranges. The R groups can be either saturated or non-conjugated unsaturated hydrocarbons. Suitable counterions accompany any charged atoms when X does not contain a net positive charge. Examples of suitable anions include $Cl^-$, $Br^-$, $I^-$, $HSO_4$—, $SO_4^{2-}$, $NO_3^-$, $HCOO$—, $CH_3COO$—, $HCO_3$—, $CO_3^{2-}$, $H_2PO_4$—, $HPO_4^{2-}$, $PO_4^{3-}$, $SCN$—, $BF_4$—, $ClO_4$—, $SSO_3$—, $CH_3SO_3$—, $CH_3C_6H_4SO_3$—, or the like, as well as mixtures thereof. Examples of suitable cations include $H^+$, $Na^+$, $Li^+$, $Ca^{2+}$, $Mg^{2+}$, $Ba^{2+}$, and the like. Specific examples of glycerolphospholipids include 1,2-dimyristoyl-sn-glycero-3-phosphocholine, wherein $R_1$ and $R_2$ are each —$(CH_2)_{12}CH_3$ and X is —$CH_2CH_2N(CH_3)_3+$, 1,2-dipalmitoyl-sn-glycero-3-phosphocholine, wherein $R_1$ and $R_2$ are each —$(CH_2)_{14}CH_3$ and X is —$CH_2CH_2N(CH_3)_3+$, 1,2-distearoyl-sn-glycero-3-phosphocholine, wherein $R_1$ and $R_2$ are each —$(CH_2)_{16}CH_3$ and X is —$CH_2CH_2N(CH_3)_3+$, 1,2-dimyristoyl-sn-glycero-3-phosphoethanolamine, wherein $R_1$ and $R_2$ are each —$(CH_2)_{12}CH_3$ and X is —$CH_2CH_2NH_3+$, 1,2-dipalmitoyl-sn-glycero-3-phosphoethanolamine, wherein $R_1$ and $R_2$ are each —$(CH_2)_{14}CH_3$ and X is —$CH_2CH_2NH_3+$, 1,2-distearoyl-sn-glycero-3-phosphoethanolamine, wherein $R_1$ and $R_2$ are each —$(CH_2)_{16}CH_3$ and X is —$CH_2CH_2NH_3+$, 1,2-dimyristoyl-sn-glycero-3-phosphoglycerol, wherein $R_1$ and $R_2$ are each —$(CH_2)_{12}CH_3$ and X is —$CH_2CH(OH)CH_2OH$, 1,2-dipalmitoyl-sn-glycero-3-phosphoglycerol, wherein $R_1$ and $R_2$ are each —$(CH_2)_{14}CH_3$ and X is —$CH_2CH(OH)CH_2OH$, 1,2-distearoyl-sn-glycero-3-phosphoglycerol, wherein $R_1$ and $R_2$ are each —$(CH_2)_{16}CH_3$ and X is —$CH_2CH(OH)CH_2OH$, 1,2-dimyristoyl-sn-glycero-3-phosphatidic acid, wherein $R_1$ and $R_2$ are each —$(CH_2)_{12}CH_3$ and X is —H, 1,2-dipalmitoyl-sn-glycero-3-phosphatidic acid, wherein $R_1$ and $R_2$ are each —$(CH_2)_{14}CH_3$ and X is —H, 1,2-distearoyl-sn-glycero-3-phosphatidic acid, wherein $R_1$ and $R_2$ are each —$(CH_2)_{16}CH_3$ and X is —H, all available from Sygena, Inc., Cambridge, Mass., and the like. Phospholipids are also available from, for example, Avanti Polar Lipids, Inc., Alabaster, Alabama, and available as PRO-LIPO from Lucas Meyer, Paris, France. The PRO-LIPO materials are available in a form such that addition of water to the commercially provided mixture leads to the spontaneous formation of liposomes; these materials are mixtures of lipids with the main component being hydrogenated phosphatidylcholine (soya based), and contain a small amount of negatively charged lipids to facilitate the formation of stable bilayers.

Also suitable are diacylglyceroles, of the general formula

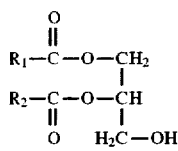

wherein $R_1$ and $R_2$ generally are hydrocarbon groups, either saturated or unsaturated, preferably with from about 10 to about 18 carbon atoms, although the number of carbon atoms can be outside this range. Specific examples of diacylglyceroles include 1,2-dimyristoyl-sn-glycerol, wherein $R_1$ and $R_2$ are each —$(CH_2)_{12}CH_3$, 1,2-dipalmitoyl-sn-glycerol, wherein $R_1$ and $R_2$ are each —$(CH_2)_{14}CH_3$, 1,2-distearoyl-sn-glycerol, wherein $R_1$ and $R_2$ are each —$(CH_2)_{16}CH_3$, all available from Sygena, Inc., Cambridge, Mass., and the like.

Also suitable are α,ω-dipolar diacetyles of the general formula

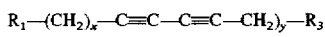

wherein x and y are each integers of from about 6 to about 10, and preferably from about 8 to about 9, and $R_1$ and $R_2$ are each —COOH, —$CH_2OH$, or —$CH_2OPO_3H_2$, prepared as disclosed in, for example, H. Bader and H. Ringsdorf, "Liposomes From α,ω-Dipolar Amphiphiles With a Polymerizable Diyne Moiety in the Hydrophobic Chain," *Journal of Polymer Science: Polymer Chemistry Edition*, vol. 20, p. 1623 (1982), the disclosure of which is totally incorporated herein by reference.

Also suitable are bis (alkyl ester) ammonium compounds, including bis (alkyl ester) ammonium halides. Among the halides, the bromides are preferred. Examples of suitable bis (alkyl ester) ammonium compounds include those of the general formula

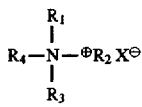

wherein:

$R_1$ is (a) a hydrogen atom, (b) an alkyl group, preferably with from 1 to about 3 carbon atoms, or

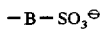 (c)

wherein B is an alkyl group, preferably with from 1 to about 3 carbon atoms; $R_2$ is (a) a hydrogen atom, (b) an alkyl group, preferably with from 1 to about 3 carbon atoms,

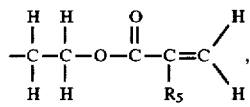 (c)

wherein $R_5$ is a hydrogen atom, a methyl group, or an ethyl group, (d) a hydroxyalcohol group, preferably with from about 2 to about 4 carbon atoms, such as

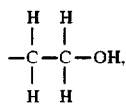

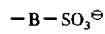 (e)

wherein B is an alkyl group, preferably with from 1 to about 3 carbon atoms, or

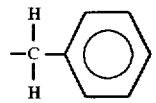 (f)

wherein the benzyl group optionally has substituents, such as (i) bromomethyl (preferably in the meta or para positions), (ii) —COOH (preferably in the para position),

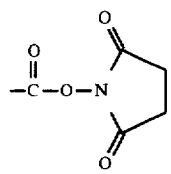 (iii)

(preferably in the para position),

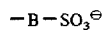 (iv)

wherein B is an alkyl group, preferably with from 1 to about 3 carbon atoms (preferably in the para position), or

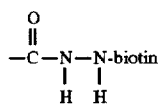 (v)

(preferably in the para position); and $R_3$ and $R_4$ each, independently of the other, are of the formula

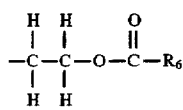

wherein $R_6$ is a long chain alkyl group, either saturated or unsaturated, with from about 8 to about 22 carbon atoms, and X is a optional halide anion (which may or may not be present when and/or $R_2$ includes an anionic species), such as fluoride, chloride, bromide, or iodide, with bromide being preferred. $R_6$ may contain more than one unsaturated linkage within the alkyl chain, although it is preferred that two or more saturated groups not be conjugated within the chain. $R_3$ and $R_4$ can either be the same as each other or different from each other. One example of a preferred $R_3$ and $R_4$ group is

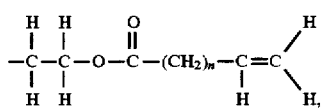

wherein n is an integer with from about 6 to about 20 carbon atoms. When polymerized liposomes of the bis (alkyl ester) ammonium compound are desired, at least one unsaturated group must be present within the molecule. Specific examples of suitable materials of this class include (3-(bromomethyl) benzyl) bis (2-(10-undecenoyloxy) ethyl) methylammonium bromide, (4-carboxybenzyl) bis (2-(10-undecenenoyloxy) ethyl) methylammonium bromide, N-hydroxysuccinimide ester of (4-carboxybenzyl) bis (2-(10-undecenoyloxy)ethyl) methyl ammonium bromide, (bis (2-(10-undecenoyloxy) ethyl) methylammonio) propane-3-sulfonate, (bis (2(10-undecenoyloxy) ethyl) ammonio) bis (ethanesulfonate), bis (2-(10-undecenoyloxy) ethyl) dimethylammonium bromide, and bis (2-(10-undecenoyloxycarbonyl)-ethyl) dimethyl ammonium bromide. These compounds can be prepared by any known or suitable method, such as the methods described by Guo et al. in "Synthesis of Surface-Functionalized, Probe-Containing, Polymerized Vesicles Derived from Ammonium Bromide Surfactants," *Langmuir*, vol. 8, pp. 815–823 (1992), and by Tundo et al., *J. Am. Chem. Soc.*, vol. 104, pp. 456–461 (1982), the disclosures of each of which are totally incorporated herein by reference. For example, bis (2-(10-undecenoyloxycarbonyl)-ethyl) dimethyl ammonium bromide can be prepared by first preparing the amine (bis-(2-(10-undecenoyloxycarbonyl) ethyl) methylamine) by reacting 10-undecenoyl acid chloride with N-methyliminobis(ethanol). After extraction with sodium hydroxide of the resulting HCl salt, the pure amine is obtained. This amine is then reacted with dimethyl sulfate, followed by extraction with a potassium bromide solution to yield bis (2(10-undecenoyloxycarbonyl)-ethyl) dimethyl ammonium bromide.

Cholesterol can be employed to improve the stability of liposomes if desired by including it in the solution containing the liposomes. Examples of mixtures include (but are not limited to) (a) mixtures of phosphatidyl choline (0.63 parts by weight), phosphatidic acid (0.14 parts by weight), and cholesterol (0.39 parts by weight) in water (10 parts by weight), wherein the particles typically exhibit an average diameter of about 100 nanometers; (b) mixtures of cholesterol (2.5 parts by weight), 1,2-dimyristoyl-sn-glycero-3-phosphoglycerol (2.5 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight) and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (c) mixtures of cholesterol (2.5 parts by weight), 1,2-dimyristoyl-sn-glycero-3-phosphoglycerol (1.3 parts by weight), and 1,2-dimyristoyl-sn-glycero-3-phosphoethanolamine (1.3 parts by weight) in various solvents, such as (i) water (100 parts by weight), (ii) mixtures of water (95 parts by weight) and sulfolane (5 parts by weight), (iii) mixtures of water (95 parts by weight) and ethylene glycol (5 parts by weight), (iv) mixtures of water (93 parts by weight) and butyl carbitol (7 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (d) mixtures of cholesterol (3.5 parts by weight) and 1,2-dimyristoyl-sn-glycero-3-phosphoglycerol (1.5 parts by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; (e) mixtures of cholesterol (3.5 parts by weight), 1,2-dimyristoyl-sn-glycero-3-phosphoglycerol (0.5 parts by weight), and 1,2-dimyristoyl-sn-glycero-3-phosphoethanolamine (1.0 part by weight) in various solvents, such as (i) water (95 parts by weight), (ii) mixtures of water (95 parts by weight) and sulfolane (5 parts by weight), (iii) mixtures of water (95 parts by weight) and ethylene glycol (5 parts by weight), (iv) mixtures of water (95 parts by weight) and butyl carbitol (5 parts by weight), (v) mixtures of water (86 parts by weight), sulfolane (5 parts by weight), and butyl carbitol (9 parts by weight), (vi) mixtures of water (95 parts by weight), sulfolane (3 parts by weight), and butyl carbitol (2 parts by weight), and the like; and any other desired mixture.

The vesicle-forming lipid is present in the ink in any effective amount. Typically, the vesicle-forming lipid is present in the ink in an amount of from about 0.5 to about 30 percent by weight, and preferably from about 1 to about 10 percent by weight, although the amount can be outside these ranges.

Liposomes of the vesicle-forming lipid can be prepared by any desired or suitable method, such as by admixing the lipid and an aqueous vehicle (either pure water or a mixture of water and other components) by mechanical dispersion, micro-emulsification, sonication, membrane extrusion, microfluidization, or the like. For example, a microfluidizer is a machine which pumps fluid at high pressures (up to about 12,000 pounds per square inch) along precisely defined microchannels and which divides the fluid into two streams and causes them to collide together at right angles at high velocity. This impingement is arranged so that nearly all of the energy supplied to the system (turbulence and cavitation) remains within the small area of liposome formation, resulting in the production of liposomes of relatively small size and relative uniformity. The lipids can be introduced into the fluidizer either as a suspension of large multi-lamellar vesicles or as a slurry of unhydrated lipid in an aqueous medium. The fluid collected can be recycled through the pump and the interaction chamber until vesicles of the desired dimensions are obtained.

The vesicles in the ink preferably have an average particle diameter of from about 10 to about 500 nanometers and usually are preferred to be from about 20 to about 100 nanometers in average particle diameter. For black inks, particle diameters of up to about 500 nanometers may be suitable, although colored inks exhibit less clarity and lower projection efficiency at these particle sizes than do inks with smaller liposomes. Particle size of the vesicles can be adjusted by several methods, such as by the choice of starting materials and substituents thereon, chain length of the hydrophobic portion(s) thereof, etc., by filtration through a controlled pore size, by microfluidization, wherein the particles are impinged on one another, by high shear mechanical mixing, by the identity and concentration of the other ink ingredients, and the like. The other ink ingredients may affect the size and stability of the liposomes. For example, a vesicle-forming lipid may, when admixed with pure water, form liposomes of about 50 nanometers in diameter, but when other ingredients, such as the organic cosolvents and humectants commonly employed in thermal ink jet inks, are added to the composition, the liposomes may swell to diameters of up to about 1,500 nanometers because the organic material, which is relatively less polar than water, may have a tendency to push apart the "tails" in the interior or the liposome bilayer membrane, thereby thickening the membrane and possibly rendering it less stable.

The stability of the liposome structures can, if desired, be enhanced. One method of stabilization entails steric stabilization of the liposomes by preparing lipid derivatives of polyalkyl ethers such as polyethylene glycol and incorporating them into the bilayer structure of the liposome membrane. For example, the Stealth Lipid, available from Liposome Technology Incorporated, consists of a polyethylene glycol polymer covalently bonded to a lipid molecule. The presence of the polyethylene glycol sterically stabilizes the liposome by increasing the distance between adjacent bilayers of a multi-membrane liposome without modifying the basic bilayer structure. These materials and processes are disclosed in, for example, U.S. Pat. No. 5,013,556 (Woodle et al.), the disclosure of which is totally incorporated herein by reference.

Another method of stabilization entails polymerization of the lipid molecules within the liposome membrane. The molecules within the membrane become bonded to each other to varying degrees. The polymerization stabilizes the liposome membrane, and when, for example, an ink cosolvent or humectant is present, the liposomes may swell but will not rupture. Polymerization is generally carried out by selecting the monomeric lipid to have one or more polymerizable groups, such as an unsaturated group or the like, and effecting polymerization subsequent to vesicle formation by any desired method, such as by application of heat, ultraviolet light, or the like. If desired, a polymerization initiator can be employed. Polymerization of the lipid molecules within liposome membranes is disclosed in, for example, H. Bader and H. Ringsdorf, "Liposomes From α,ω-Dipolar Amphiphiles With a Polymerizable Diyne Moiety in the Hydrophobic Chain," *Journal of Polymer Science: Polymer Chemistry Edition*, vol. 20, p. 1623 (1982); D. F. O'Brien et al., "Preparation and Characterization of Polymerized Liposomes," *Annals New York Academy of Sciences*, vol. 446, p. 282 (1985); P. Tundo et al., "Functionally Polymerized Surfactant Vesicles; Synthesis and Characterization," *J. Am. Chem. Soc.*, vol. 104, p. 456 (1982); K. Kurihara and J. Fendler, "Stabilization of Small Unilamellar Liposomes: Polymerization of Surfactants in Phospholipid Vesicles," *J. Chem. Soc., Chem. Commun.*, vol. 21, p. 1188 (1983); H. Ringsdorf and B. Schlarb, "Liposomes in a Net From Lipids With Ionically or Covalently Bound Polymerizable Headgroups," *Polym. Prepr. (Am. Chem. Soc., Div. Polym. Chem.)*, vol. 27, no. 2, p. 195 (1985); E. Hasegawa et al., "Synthesis of Novel Styrene Groups Containing Glycerophosphocholines and their Polymerization as Liposomes," *Makromol. Chem., Rapid Commun.*, vol. 5, p. 779 (1984); E. Hasegawa et al., "Synthesis of Polymerizable Glycerophosphocholines and their Polymerized Vesicles," *Polymer Bulletin*, vol. 14, p. 31 (1985); P. Tyminski and I. Ponticello, "Polymerizable Dienoyl Lipids as Spectroscopic Bilayer Membrane Probes," *J. Am. Chem. Soc.*, vol. 109, p. 6541 (1987); H. Ohno et al., "Gamma-Ray Polymerization of Phospholipids Having Diene or Triene Groups as Liposomes," *Journal of Polymer Science: Polymer Chemistry Edition*, vol. 24, p. 2959 (1986); and V. Torchilin et al., "Polymerization of Liposome-Encapsulated Hydrophilic Monomers," *Makromol. Chem., Rapid Commun.*, vol. 8, p. 457 (1987); the disclosures of each of which are totally incorporated herein by reference. The entire liposome need not be polymerized to obtain stabilization; portions or patches of the liposome can be polymerized while other portions of the liposome membrane structure remain unpolymerized, since the structural integrity of the liposome structure is also enhanced by the presence of the pigment particles. Alternatively, the liposome membrane can be coated with a polymer net, wherein the polymer is adsorbed onto the vesicle membrane but without any covalent linkage between the vesicle and the polymer, as disclosed in, for example, K. Aliev, *Makromol. Chem., Rapid Commun.*, vol. 5, p. 345 (1984), the disclosure of which is totally incorporated herein by reference.

Inks of the present invention also contain a pigment colorant. In some embodiments of the present invention, pigment particles are contained within the central cavities of the liposomes. In other embodiments of the present invention, pigment particles are contained between two or more membrane structures within vesicles having two or more bilayer membranes. In yet other embodiments of the present invention, pigment particles are contained within the vesicle membrane, and are situated between the molecules forming the bilayer membrane. Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Hoechst), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Hoechst, including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges.

Within the ink compositions of the present invention, the pigment is present in any effective amount to achieve the desired degree of coloration. Typically, the pigment is present in the ink in an amount of from about 0.1 to about 8 percent by weight, and preferably from about 2 to about 7 percent by weight, although the amount can be outside these ranges.

The pigment particles and liposomes preferably are present in relative amounts with respect to each other such that at least 50 percent, and preferably 100 percent, of the surface area of the pigment particles is in contact with liposomes, although a lesser relative amount of liposomes may be selected. When the selected pigment is not purchased as a commercial dispersion, preferably the coverage of the pigment particles by the liposomes is 100 percent for optimum stability. The pigment particles and liposomes preferably are present in relative amounts with respect to each other of from about 25 parts by weight pigment per 100 parts by liposomes to about 500 parts by weight pigment per 100 parts by weight liposomes, although the relative amounts by weight can be outside this range.

Other additives can also be present in the inks. For example, one or more dispersing agents or surfactants or wetting agents may be added to the ink. These additives can be of the cationic, anionic, or nonionic types, with nonionic types being preferred. Suitable surfactants, dispersing agents, and wetting agents include copolymers of naphthalene sulfonic acid salt and formaldehyde, including Daxad® 11, 11KLS, 19, 19K, and the like available from W. R. Grace & Company, the Lomar® D series available from Diamond Shamrock Corporation, vinyl aromatic salts available from Polyscience Company, Tamol® SN, Tamol® LG, the Triton® series available from Rohm and Haas Company, the Igepal® series available from GAF Company, the Tergitol® series available from Union Carbide, and other commercially available surfactants. These surfactants, dispersing agents, and wetting agents, if present, are present in any effective or desired amount, typically from about 0.01 to about 10 percent by weight of the ink, and preferably from about 0.01 to about 3 percent by weight of the ink, although the amount can be outside these ranges.

One example of an additive to the inks is a polymeric additive consisting of two polyalkylene oxide chains bound to a central bisphenol-A-type moiety. This additive is of the formula

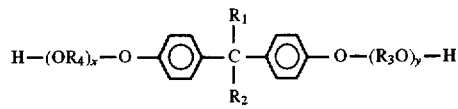

wherein $R_1$ and $R_2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R_3$ and $R_4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the ink composition of the present invention include biocides, such as Dowicil 150, 200, and 75, benzoate salts, sorbate salts, and the like, typically present in an amount of from about 0.0001 to about 4 percent by weight, and preferably from about 0.01 to about 2.0 percent by weight, although the amount can be outside these ranges, humectants, such as ethylene glycol, diethylene glycol, propylene glycol, N-methylpyrrolidinone, hydroxyethers, ethers, amides, cyclic amides, sulfones, sulfoxides, ketones, lactones, esters, alcohols, and the like, typically present in an amount of from 0 to about 70 percent by weight, and preferably from about 3 to about 40 percent by weight, although the amount can be outside these ranges, antioxidants, including derivatives of phenols such as BHT, 2,6-di-t-butylphenol, and the like, tocopherol derivatives such as Vitamin E and the like, aromatic amines, alkyl and aromatic sulfides, and the like, typically present in an amount of from 0 to about 10 percent by weight, and preferably from 0 to about 5 percent by weight, although the amount can be outside these ranges, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, typically present in an amount of from 0 to about 10 percent by weight, and preferably from about 0.001 to about 5 percent by weight, although the amount can be outside these ranges, drying accelerating agents, such as sodium lauryl sulfate, N,N-diethyl-m-toluamide, cyclohexylpyrrolidinone, butylcarbitol, and the like, typically present in an amount of from about 0.001 to about 5 percent by weight, and preferably from about 0.01 to about 3 percent by weight, although the amount can be outside these ranges, surface tension modifiers, such as sodium lauryl sulfate, sodium octyl sulfate, and the like, typically present in an amount of from 0 to about 10 percent by weight, and preferably from 0 to about 5 percent by weight, although the amount can be outside these ranges, ink penetrants, such as alcohols, sodium lauryl sulfate, esters, ketones, and the like, typically present in an amount of from about 0.001 to about 15 percent by weight, and preferably from about 0.001 to about 10 percent by weight, although the amount can be outside these ranges, and additives for improving waterfastness and lightfastness, such as polyethyleneimine, ethylene and propylene oxide modified polyethyleneimine, and the like, typically present in an amount of from 0 to about 10 percent by weight, and preferably from 0 to about 5 percent by weight, although the amount can be outside these ranges. The viscosity of the ink composition typically is from about 1 to about 10 centipoise (measured at 25° C.) and preferably is less than about 3 centipoise, although the viscosity can be outside these ranges. The surface tension of the ink composition typically is from about 20 to about 55 milliNewtons per meter (mN/m) (measured at about 25° C.), and preferably is from about 25 to about 50 mN/m, although the surface tension can be outside these ranges.

Inks of the present invention can be prepared by any process suitable for preparing aqueous-based inks. For example, the ink ingredients, including the prepared liposomes, can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the pH of the ink can be adjusted if desired or necessary. Finally, the ink composition generally is filtered to remove any undesired solid or particulate matter, preferably removing any particles greater than about 2 microns in average particle diameter. Some liposome-based inks may not be suitable for filtration processes, and in these instances large particles can be removed via centrifugation. The prepared liposomes can be obtained by any suitable or desired methods, such as those described in *Liposomes, A Practical Approach*, edited by R. R. C. New, IRL Press, Oxford University Press (1990), the disclosure of which is totally incorporated herein by reference. Specific examples of suitable methods for obtaining liposomes from solutions of lipids include mechanical dispersion, microfluidization and/or sonication processes, French Press, membrane extrusion, solvent dispersion, and the like.

Printed images may be generated with the inks of the present invention by incorporating the inks into a thermal ink jet printer and causing droplets of the ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. The inks of the present invention are also suitable for use in piezoelectric drop-on-demand ink jet printing systems and in continuous stream ink jet printing systems, including those that have been modified to be capable of heating the ink. Any suitable substrate can be employed, including plain papers such as Xerox® 4024 papers, including Ashdown 4024 DP, Cortland 4024 DP, Champion 4024 DP, Xerox® 4024 D.P. green, Xerox® 4024 D.P. pink, Xerox® 4024 D.P yellow, and the like, Xerox® 4200 papers, Xerox® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox® 3R3351, Tetronix ink jet transparencies, Arkright ink jet transparencies, and the like, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

The lipid bis-(2-(10-undecenoyloxycarbonyl)-ethyl) dimethyl ammonium bromide was prepared as follows. 29 grams (143 mmol) of 10-undecenoylchloride was added to a solution of 7.7 grams (67 mmol) of N-methyliminobis (ethanol) in 50 milliliters of dimethyl formamide. After the solution stood for 1 hour, bis-(2-(10-undecenoyloxycarbonyl) ethyl)-methylamine hydrochloride spontaneously crystallized. 160 milliliters of diethylether was then added and the mixture was cooled at −10° C. and filtered. Finally, bis-(2-(10-undecenoyloxycarbonyl) ethyl)-methylamine hydrochloride was recrystallized from 80 milliliters of ethylacetate. The pure amine was obtained after extraction of bis-(2(10-undecenoyloxycarbonyl) ethyl)-methylamine hydrochloride with sodium hydroxide in methylenechloride. Yield=31.4 g=89.2%; m.p.: 69°–70° C.; FT-IR (Film, in cm$^{-1}$): 1738, 1640, 2855–2927; $^{1}$H-NMR (CDCl$_3$, TMS, bis-(2-(10-undecenoyloxycarbonyl) ethyl)-methylamine) (in ppm): 5.87 (m, 2H), 4.9–5.02 (m, 4H), 4.17 (t, 4H), 2.3 (t, 4H), 2.35 (s, 3H), 2.03 (q, 4H), 1.28–1.38 (m (br), 20H); $^{13}$C-NMR (CDCl$_3$, TMS, bis-(2-(10-undecenoyloxycarbonyl) ethyl)-methylamine) (in ppm): 173.7, 139.05, 114.08, 61.87, 55.88, 42.80, 34.20, 33.70, 29.20, 29.1, 29.04, 29.00, 24.84.

4.88 grams (10 mmol) of liquid bis-(2-(10-undecenoyloxycarbonyl) ethyl)-methylamine was then added to 2.5 grams (20 mmol) of dimethyl sulfate and heated for 4 hours at 85° C. 50 milliliters of ethyl ether and 50 milliliters of methylene chloride were then added and the solution was extracted 5 times with 100 milliliters of a saturated aqueous solution of potassium bromide. The subsequent solvent removal yielded the product bis-(2-(10-undecenoyloxycarbonyl)-ethyl) dimethyl ammonium bromide. Yield: 5.43 g=99.4%; m.p.: 15°–20° C.; FT-IR (KBr, in cm$^{-1}$): 1641, 1740, 1751, 2850–2920; $^1$H-NMR (CDCl$_3$, TMS) (in ppm): 5.8 (m, 2H), 4.9 (m, 4H), 4.6 (t (br), 4H), 4.13 (t (br), 4H), 3.54 (s, 6H), 2.36 (t, 4H), 2.03 (q, 4H), 1.60 (m (br), 4H), 1.28–1.37 (m (br), 20H); $^{13}$C-NMR (CDCl$_3$, TMS) (in ppm): 172.7, 139.0, 114.10, 63.70, 57.50, 52.47, 33.90, 33.70, 29.20, 29.10, 28.98, 28.81, 24.6.

An aqueous ink composition was then prepared by admixing 630 milligrams of the lipid bis-(2-(10-undecenoyloxycarbonyl)-ethyl) dimethyl ammonium bromide with 600 milligrams of a black pigment (Raven® 5250 carbon black coated with trifluoropropyltrichlorosilane (20 percent by weight of the pigment) and 3 milligrams of benzoyl peroxide in 12 milliliters of deionized water. Treatment of the carbon black was done by passing dry air through a vessel containing the trifluoropropyltrichlorosilane until all of the trifluoropropyltrichlorosilane was volatilized, followed by passing the volatilized trifluoropropyltrichlorosilane through a tubular reactor containing the carbon black. The triluoropropyltrichlorosilane adsorbed on the surface of the carbon black, rendering the carbon black hydrophobic. Following suspension of the ink ingredients in the water, the mixture was ultrasonicated for a period of 4 minutes at room temperature with a Sonicator® (Ultrasonics) Model 350 (obtained from Heat Systems-Ultrasonic Inc.) (continuous pulse 50 percent cycles/7 micro tips). Thereafter, the liposomes in the ink were polymerized by heating the ink for 6 hours at 80° C.

The ink thus prepared was incorporated into a Hewlett-Packard Deskjet printer and images were generated on Xerox® 4024 paper, Ashdown 4200 A261 14YD (-902B) paper, Hammermill paper, and Tidal DP (WBW 8765 302) paper, in each instance resulting in the formation of images with excellent edge raggedness properties, excellent mflen, and excellent optical densities.

A polymerized-liposome-containing solution was prepared by admixing 630 milligrams of the lipid bis-(2-(10-undecenoyloxycarbonyl)-ethyl) dimethyl ammonium bromide with 12 milliliters of deionized water. Following suspension of the lipid in the water, the mixture was ultrasonicated for a period of 4 minutes at room temperature with a Sonicator® (Ultrasonics) Model 350 (obtained from Heat Systems-Ultrasonic Inc.) (continuous pulse 50 percent cycles/7 micro tips). Thereafter, the liposomes in the ink were polymerized by heating the ink for 6 hours at 80° C. The polymerization was monitored using NMR-spectroscopy and the stability was investigated by measuring the particle size stability upon addition of different amounts of ethanol. A decrease in intensity for the 5.9 ppm peak was observed and attributed to the double bond of the monomeric lipid upon polymerization. The increased stability of the polymeric liposomes (after 6 hours at 80° C.) was demonstrated by measuring the variations in particle size that resulted from the addition of different amounts of ethanol before and after the polymerization. For the unpolymerized liposomes, the particle size was found to increase from less than about 250 nm to as much as about 4500 nm (unstable liposomes) with the addition of as little as 10 volume percent of ethanol. The heat polymerized liposomes were much more stable; the particle size of the polymerized liposomes slowly increased from about 250 nm to about 500 nm upon addition of up to 50 volume percent ethanol (stable swollen liposomes). At higher concentrations of ethanol, the heat polymerized liposomes were found to be less stable, with the collapse point at about 70 volume percent ethanol. In a separate experiment under the same conditions except that the same liposomes were polymerized with UV light instead of heat, the resulting polymerized liposomes were fully stabilized. The stable liposomes increased in size from about 250 nm to about 500 nm upon addition of 50 volume percent ethanol, after which the particle size remained constant irrespective of the amount of ethanol added up to 90 volume percent ethanol.

EXAMPLE II

Aqueous pigmented ink compositions were prepared by admixing 0.6 grams of the lipid bis-(2-(10-undecenoyloxycarbonyl)ethyl) dimethyl ammonium bromide, prepared as described in Example I, with 1.2 grams of pigment, 0.06 gram of a free radical initiator, and 22.2 grams of deionized water. The mixtures were each sonicated for 5 minutes at room temperature with a Sonicator® (Ultrasonics) Model 350 (obtained from Heat Systems-Ultrasonic Inc.) (continuous pulse 50 percent cycles/7 micro tips), and then divided into two halves. One half of each was heated in an oil bath for 6 hours at 80° C. to effect polymerization and the other half was kept at room temperature (no polymerization).

II.1

The initiator selected was benzoyl peroxide (obtained from Aldrich Chemical Co., Milwaukee, Wis.) and the pigment was PV Fast Blue B2G4 (obtained from American Hoechst). The inks (Inks A and B in Table 1) thus prepared and each containing about 5 weight percent of pigment and 2.5 weight percent of the lipid were incorporated into a Hewlett-Packard Deskjet® printer and images were generated on Xerox® 4024 DP paper, resulting in the formation of images with excellent edge raggedness properties and optical densities, as shown in Table 1 (wherein "n/a" indicates that the property was not measured).

II.2

The initiator selected was benzoyl peroxide (obtained from Aldrich Chemical Co., Milwaukee, Wis.) and the pigment was Conductex SC Ultra carbon black, which was coated with trifluoropropyltrichlorosilane (20% by weight of the pigment) by the process described in Example I. The inks (Inks C,D and E,F (duplicate experiments) in Table 1) thus prepared and each containing about 5 weight percent of the pigment and 2.5 weight percent of the lipid were incorporated into a Hewlett-Packard Deskjet® printer and images were generated on Xerox® 4024 DP paper, resulting in the formation of images with excellent edge raggedness properties and optical densities, as shown in Table 1 (wherein "n/a" indicates that the property was not measured).

II.3

The initiator selected was benzoyl peroxide (obtained from Aldrich Chemical Co., Milwaukee, Wis.) and the pigment was Conductex SC Ultra carbon black. The inks (Inks G and H in Table 1) thus prepared and each containing about 5 weight percent of the pigment and 2.5 weight percent of the lipid were incorporated into a Hewlett-Packard Deskjet® printer and images were generated on Xerox® 4024 DP paper, resulting in the formation of images with excellent edge raggedness properties and optical densities, as shown in Table 1 (wherein "n/a" indicates that the property was not measured).

TABLE 1

Properties of Pigmented Inks Containing Liposomes

| Ink | Viscosity (centipoise, 25° C.) | Surface Tension (mN/m) | Optical Density | 3-pixel linewidth (microns) | Comments |
|---|---|---|---|---|---|
| A | 2.26 | 27.0 | 1.12 | 286.5 ± 21.8 | Monomeric Lipids (ML) |
| B | 2.55 | 26.9 | 0.99 | 268.2 ± 27.2 | Polymeric Lipid (PL) |
| C | 1.43 | 26.5 | 1.28 | 208.9 ± 14.9 | ML |
| D | 1.34 | 26.6 | n/a | | PL |
| F | 1.72 | 29.5 | n/a | | ML |
| F | 1.77 | 29.8 | n/a | | PL |
| G | 1.68 | 27.0 | 0.70 | 320.0 ± 13.4 | ML |
| H | 1.71 | 26.7 | n/a | | PL |

The above data indicate that the ink compositions jetted from an ink jet printer even in the absence of traditional humectants and cosolvents. Further, the polymerized liposome containing inks exhibited reduced ink spreading and sharper lines compared to the nonpolymerized liposome containing inks. Further, the use of highly hydrophobic pigments resulted in increased optical density.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises an aqueous liquid vehicle, a pigment, and a vesicle-forming lipid, wherein vesicles of the lipid are present in the ink, wherein at least some of the pigment particles are either associated with vesicles of the lipid or contained within vesicles of the lipid.

2. An ink composition according to claim 1 wherein the vesicle-forming lipid is selected from the group consisting of glycerophospholipids, diacylglyceroles, α,ω-dipolar diacetyles, and mixtures thereof.

3. An ink composition according to claim 1 wherein the vesicle-forming lipid is selected from the group consisting of phosphatidic acids, phosphatidylethanolamines, phosphatidylcholines, phosphatidylserines, phosphatidylinositols, phosphatidylglycerols, diphosphatidylglycerols, and mixtures thereof.

4. An ink composition according to claim 1 wherein the vesicle-forming lipid is present in the ink in an amount of from about 0.5 to about 30 percent by weight.

5. An ink composition according to claim 1 wherein the vesicle-forming lipid is present in the ink in an amount of from about 1 to about 10 percent by weight.

6. An ink composition according to claim 1 wherein the vesicle-forming lipid and the pigment are present in relative amounts that enable at least 50 percent of the pigment surface area to be in contact with the lipid.

7. An ink composition according to claim 1 wherein the vesicle-forming lipid and the pigment are present in relative amounts of from about 25 parts by weight pigment per 100 parts by lipid to about 500 parts by weight pigment per 100 parts by weight lipid.

8. An ink composition according to claim 1 wherein the vesicles have an average particle diameter of less than about 500 nanometers.

9. An ink composition according to claim 1 wherein the vesicles have an average particle diameter of less than about 100 nanometers.

10. An ink composition according to claim 1 wherein the vesicles have membranes of lipid molecules, wherein at least some of the lipid molecules are bonded to other lipid molecules in the membrane by a polymerization process.

11. An ink composition according to claim 1 wherein at least some of the pigment particles are contained within vesicles of the lipid.

12. An ink composition according to claim 1 wherein at least some of the pigment particles are associated with vesicles of the lipid.

13. An ink composition which comprises an aqueous liquid vehicle, a pigment, and a vesicle-forming lipid, wherein vesicles of the lipid are present in the ink, wherein the vesicle-forming lipid is a bis (alkyl ester) ammonium compound.

14. An ink composition according to claim 13 wherein the vesicle-forming lipid is a bis (alkyl ester) ammonium halide.

15. An ink composition according to claim 2 wherein the vesicle-forming lipid is of the formula

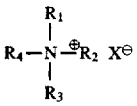

wherein:

(1) $R_1$ is (a) a hydrogen atom, (b) or alkyl group with from 1 to about 3 carbon atoms, or $$-B-SO_3^{\ominus}, \quad (c)$$

wherein B is an alkyl group with from 1 to about 3 carbon atoms;

(2) $R_2$ is (a) a hydrogen atom, (b) an alkyl group with from 1 to about 3 carbon atoms,

wherein $R_5$ is a hydrogen atom, a methyl group, or an ethyl group, (d) a hydroxyalcohol group with from about 2 to about 4 carbon atoms, $$-B-SO_3^{\ominus} \quad (e)$$

wherein B is an alkyl groups with from 1 to about 3 carbon atoms, or

wherein the benzyl group is either substituted or unsubstituted;

(3) $R_3$ and $R_4$ each, independently of the other, are of the formula

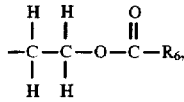

wherein $R_6$ is a long chain alkyl group with from about 8 to about 22 carbon atoms; and (4) X is an optional halide anion.

16. An ink composition according to claim 13 wherein the vesicle-forming lipid is selected from the group consisting of (3-(bromomethyl) benzyl) bis (2-(10-undecenoyloxy)

ethyl) methylammonium bromide; (4-carboxybenzyl) bis (2-(10-undecenenoyloxy) ethyl) methylammonium bromide; N-hydroxysuccinimide ester of (4-carboxybenzyl) bis (2-(10-undecenoyloxy)ethyl) methyl ammonium bromide; (bis (2-(10-undecenoyloxy) ethyl) methylammonio) propane-3-sulfonate; (bis (2-(10-undecenoyloxy) ethyl) ammonio) bis (ethanesulfonate); bis (2-(10-undecenoyloxy) ethyl) dimethylammonium bromide; bis (2-(10-undecenoyloxycarbonyl)-ethyl) dimethyl ammonium bromide; and mixtures thereof.

17. An ink composition according to claim 13 wherein the vesicle-forming lipid is present in the ink in an amount of from about 0.5 to about 30 percent by weight.

18. An ink composition according to claim 13 wherein the vesicle-forming lipid is present in the ink in an amount of from about 1 to about 10 percent by weight.

19. An ink composition according to claim 13 wherein the vesicle-forming lipid and the pigment are present in relative amounts that enable at least 50 percent of the pigment surface area to be in contact with the lipid.

20. An ink composition according to claim 13 wherein the vesicle-forming lipid and the pigment are present in relative amounts of from about 25 parts by weight pigment per 100 parts by lipid to about 500 parts by weight pigment per 100 parts by weight lipid.

21. An ink composition according to claim 13 wherein the vesicles have an average particle diameter of less than about 500 nanometers.

22. An ink composition according to claim 13 wherein the vesicles have an average particle diameter of less than about 100 nanometers.

23. An ink composition according to claim 13 wherein the vesicles have membranes of lipid molecules, wherein at least some of the lipid molecules are bonded to other lipid molecules in the membrane by a polymerization process.

24. A printing process which comprises incorporating into an ink jet printer an ink composition according to claim 13 and causing droplets of the ink to be ejected in imagewise pattern onto a substrate.

25. A printing process according to claim 24 wherein the ink jet printer is a thermal ink jet printer and wherein the ink is selectively heated in an imagewise pattern, thereby causing droplets of the ink to be ejected in an imagewise pattern.

26. An ink composition which comprises an aqueous liquid vehicle, a pigment, and a vesicle-forming lipid, wherein vesicles of the lipid are present in the ink, wherein the pigment is hydrophobic.

27. An ink composition according to claim 26 wherein the pigment is rendered hydrophobic via a hydrophobic material adsorbed on the surface thereof.

28. An ink composition according to claim 27 wherein the hydrophobic material is triluoropropyltrichlorosilane.

29. An ink composition which comprises an aqueous liquid vehicle, a pigment, and a vesicle-forming lipid, wherein vesicles of the lipid are present in the ink, wherein the pigment is hydrophilic.

30. A printing process which comprises incorporating into an ink jet printer an ink composition according to claim 1 and causing droplets of the ink to be ejected in imagewise pattern onto a substrate.

31. A printing process according to claim 30 wherein the ink jet printer is a thermal ink jet printer and wherein the ink is selectively heated in an imagewise pattern, thereby causing droplets of the ink to be ejected in an imagewise pattern.

* * * * *